Feb. 16, 1960   W. J. GEORGE ET AL   2,925,068
SEAL FOR FLUID METER

Filed Dec. 23, 1958   2 Sheets-Sheet 1

INVENTORS.
William J. George
Lawrence Mariani
BY
THEIR ATTORNEYS

Feb. 16, 1960 W. J. GEORGE ET AL 2,925,068
SEAL FOR FLUID METER
Filed Dec. 23, 1958 2 Sheets-Sheet 2

INVENTORS.
William J. George
Lawrence Mariani
BY
THEIR ATTORNEYS

United States Patent Office 2,925,068
Patented Feb. 16, 1960

2,925,068

SEAL FOR FLUID METER

William J. George, Canonsburg, and Lawrence Mariani, Pittsburgh, Pa.

Application December 23, 1958, Serial No. 782,485

11 Claims. (Cl. 121—187)

This invention relates to improved multi-piston fluid meters, and more particularly to an improved seal between an outlet conduit and a rotatable distributor valve in multi-piston meters, such as are used in gasoline pumps and the like.

Multi-piston meters as used in gasoline pumps have a rotary valve mechanism which simultaneously connects opposed cylinders, so that one cylinder is in communication with an inlet duct, and another cylinder is in communication with an outlet duct. Each cylinder is provided with a piston, and while one piston is pumping in a quantity of fluid through the inlet duct, the other piston is simultaneously discharging a fixed quantity of fluid through the outlet duct.

A serious problem which has plagued this type of meter in the past has been the difficulty of obtaining a satisfactory seal between the rotary valve mechanism and the adjacent outlet duct, so as to perfect an adequate seal between the inlet and outlet ducts. A major breakthrough and important advance in overcoming this problem is illustrated in the George Patent No. 2,841,121, issued July 1, 1958. In his patent, George discloses the idea of making the output duct out of telescoping sleeve members resiliently urged apart by means of a spring and sealed by a cylindrical neoprene member. Although the device disclosed by George operates satisfactorily, it is expensive to produce, since it necessitates the manufacture and assembly of guide rods, a compression spring, a neoprene cylinder, and two clamping rings for retaining the neoprene cylindrical sealing member in position.

Our invention encompasses an improvement over such a device as disclosed by George and eliminates the complicated and expensive assembly of guide rods, compression springs, clamping rings and a cylindrical neoprene sealing member. In place of these numerous parts, we have incorporated a novel gasket means for effectively sealing the telescopic members while simultaneously resiliently urging the lower member into an operable sealing engagement with the rotatable valve mechanism to effect a fluid-tight seal between the inlet and outlet conduits and the rotatable valve mechanism, so that simultaneous discharge and intake may be occasioned through the rotatable valve.

It has thus been an object of our invention to provide an improved and simplified outlet duct assembly;

Another object of our invention has been to provide a new and improved telescopically-slidable sleeve outlet duct assembly which will maintain a sealing engagement with a rotary valve and provide an operable seal between the input and output ducts that communicate with the valve;

A further object of our invention has been to provide a slidable sleeve duct assembly having mating telescoping, cylindrical members compressibly clamped together and resiliently urged apart along their longitudinal axes by a sealing gasket positioned between opposed sealing surfaces of the telescoping members;

A further object of our invention has been to provide a telescopically-slidable sleeve duct assembly having an annular sealing gasket operatively retained between opposed sealing surfaces of the telescopically slidable sleeve members to resiliently urge the members longitudinally-apart, so that one of the members is retained in an operable sealing engagement with a rotating valve;

A still further object of our invention has been to provide telescopically slidable sleeve members having an annular foraminous sealing gasket compressibly retained between opposed diagonal surfaces of the sleeve members which gasket operatively retains one of the telescopic sleeve members in an operable sealing engagement with a rotary valve.

These and other objects of our invention will be apparent to those skilled in the art from a consideration of the following description and accompanying drawings in which.

Figure 1:
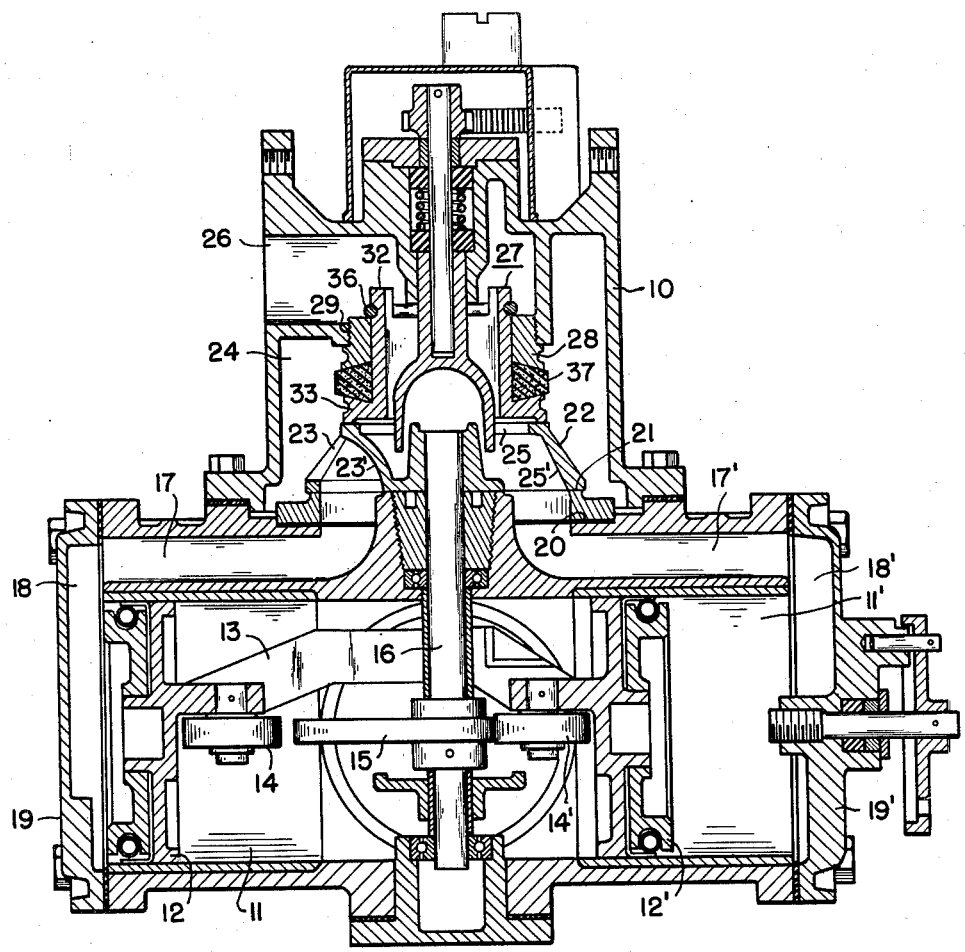
Figure 1 is a side elevational view in section through a multi-piston meter, including a telescopically-slidable sleeve duct assembly embodying our invention.

Referring now to the drawings and particularly to Figure 1, a casing or meter housing 10 contains opposed working cylinders 11 and 11'. Although only one set of opposed cylinders is illustrated in the drawings, it is to be understood that any number of opposed cylinders may be utilized, as desired. Each cylinder is provided with a piston 12 or 12' that are connected together by connecting bars or yokes 13, so that they will move in unison. Each piston is provided with a cam follower 14 or 14' which is operatively engageable with a cam or eccentric 15 mounted on a cam drive shaft 16. Passageways 17 and 17', formed in the casing 10, communicate with cylinders 11 and 11', respectively, through recesses 18 and 18' that are formed in end closures or cover plates 19 and 19'. The passageways 17 and 17' terminate adjacent a flat seat 20.

A valve seat 21 of suitable material is secured to casing 10 on a flat seat face 20. A rotatable, cone-shaped distributor valve 22, secured on and rotated by the drive shaft 16, operatively rotates on the valve seat 21. The valve 22 has a side or inlet port 23 communicable with inlet duct 23' and inlet chamber 24. A central or outlet port 25 is formed within the rotatable distributor valve 22 and communicates with an outlet duct 25' of the valve 22 and with a telescopically-slidable sleeve duct assembly 27 that leads to an outlet port 26 formed in a casing 10.

The telescopically-slidable sleeve duct assembly 27 comprises a hollow lower or inner cylindrical nose part 31 (see figure 2) that is telescopically received within a hollow, upper or outer cylindrical housing part or clamping ring or collar 28. The outer cylindrical housing part 28 has an externally-threaded portion 29 adjacent its upper end for threadable engagement with an internally-threaded portion of the casing 10 (see Figure 1). The housing part 28 terminates at its lower end in a radially-outwardly-declining gripping, clamping and sealing surface or end face 30.

The hollow inner cylindrical nose part 31 has opposed arcuate segments 32 projecting axially-upwardly therefrom. Outer arcuate recesses 32a are formed within the segments 32 for retaining a spring-like clamping or lock ring 36. A radical flange 33 projects radially-outwardly adjacent the lower end of the nose part 31 and has a radially-outwardly, inclining gripping and sealing upper surface or face 34. The bottom end or face of the radial flange 33 is provided with a sealing surface 35 for operable engagement with a top surface of the rotatable distributor valve 22.

Figure 2:
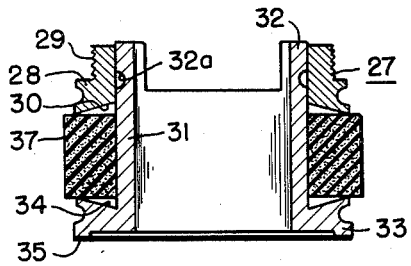
Figure 2 is an elevational view in section of a telescopically-slidable sleeve duct assembly embodying our invention showing the parts in an expanded position before being compressibly assembled.
Figure 3:
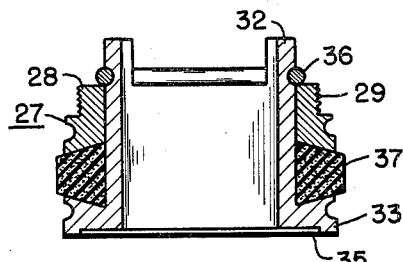
Figure 3 is an elevational view in section showing a telescopically-slidable sleeve duct assembly embodying our invention in an assembled form.
Figure 4:
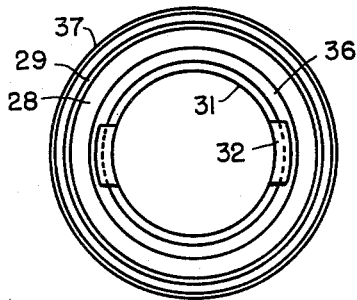
Figure 4 is a top plan view of the device as shown in Figure 3.
Figure 5:
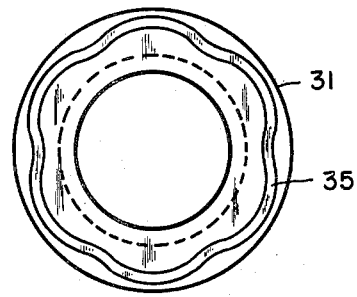
Figure 5 is a bottom plan view of the device as shown in Figure 3.

An annular, foraminous gasket of compressible material, such as foam or sponge rubber, is shown in Figures 2 and 3, positioned between the radially-outwardly, declining, gripping and sealing surface 30 and the opposed radially-outwardly, inclining, gripping and sealing surface 34. The hollow outer cylindrical housing part, ring or collar 28 is then moved downwardly on the hollow inner cylindrical nose part 31, compressing the annular foraminous gasket 37 between the gripping and sealing surfaces 30 and 34. The clamping or spring ring 36 is positioned within recesses 32a to retain or lock the housing part 28 in compression against the annular gasket 37 (see Figures 3 and 4). The opposed outwardly converging surfaces 30 and 34 operate to both grip the annular gasket and retain it in sealing engagement between the telescoping members 28 and 31, and if the gasket 37 should swell, due to ageing or a contact with gasoline, the swelling will impart a greater sealing action against the slanting surfaces 30 and 34.

From the foregoing arrangement it can be seen that the annular gasket 37 not only acts as a sealing gasket, but also resiliently urges the telescoping members 28 and 31 apart along their longitudinal axes. Thus, when the outer cylindrical housing part 28 is secured within the casing 10 by means of threaded portion 29, it can be seen that the compressed annular foraminous gasket 37 resiliently urges the inner cylindrical nose part 31 downwardly against the top surface of the rotatable distributor valve 22 to thereby form an effective, operable sealing engagement with the rotating valve 22 through sealing surface 35. The compressed gasket 37 located between the telescoping members 28 and 31, provides a fluid-tight passage between the rotary valve 22 and the output port 26, and due to the resiliency of the gasket 37, the nose part 31 is capable of following irregularities in the travel surface of the top face of the rotary valve 22. The hollow inner cylindrical nose part 31 does not tend to rotate within the hollow cylindrical housing part 28, due to frictional and compressive forces maintained between the telescopic members by the annular gasket 37.

Figure 6:
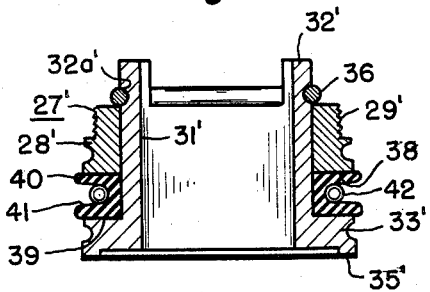
Figure 6 is an elevational view in section of another embodiment of our telescopically-slidable sleeve duct assembly in an assembled form.
Figure 7:
Figure 7 is an elevational view in section of a gasket utilized in the embodiment of Figures 2 and 3.
Figure 8:
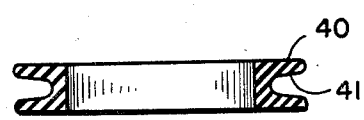
Figure 8 is an elevational view in section showing a gasket utilized in the embodiment of Figure 6; and, Figure 9 is a plan view of a spring coil utilized with the gasket in the embodiment shown in Figure 6.
Figure 9:
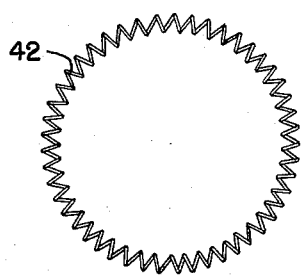

Figure 6 illustrates another embodiment of a telescopically-slidable sleeve duct assembly 27'. The assembly 27' is similar in many respects to the assembly 27, and comprises an outer cylindrical housing ring or collar part 28' having a threaded portion 29' adjacent its upper end, and terminating at its lower end in a flat, horizontal sealing end surface 38. Hollow cylindrical nose part 31' is telescopically slidable within the housing part 28' and has opposed, arcuate segments 32' that project axially-upwardly and have arcuate recesses 32a' formed therewithin. The nose part 31' has a radially-outwardly-extending flange or bottom end portion 33' adjacent its lower end which has an upper, flat, horizontal sealing surface 39 and a bottom sealing surface 35'. A resilient annular gasket 40, made of suitable material such as rubber or flexible plastic, having an annular recess 41, is positioned between the flat, horizontal sealing surfaces 38 and 39, and is compressibly retained against the inner cylindrical nose part 31' by means of an annular coil spring 42 positioned within the recess 41 under tension.

The housing part 28' is compressibly held against the gasket 40 by means of spring clamp or locking ring 36 that is positioned within recess 32a'. The telescopically-slidable sleeve duct assembly 27' when mounted within the casing 10 will operate in a manner similar to the assembly 27, in that the gasket 40 will resiliently urge the inner cylindrical nose part 31' downwardly into sealing engagement with the top of the rotatable distributor valve 22 to form a fluid-tight seal therewith, which compensates for irregularities in the travel surface of the top of the valve 22. In this construction, a harder or less resilient gasket 40 is preferably employed, whereas in the construction of Figure 3, a foam rubber or resin gasket is preferably employed.

In operation, liquid enters through inlet chamber 24, port 23, inlet duct 23', and then through the passageway 17 and recess 18 to cylinder 11. Simultaneously, a metered quantity of fluid is discharged from cylinder 11', through recess 18', passageway 17', outlet duct 25', and outlet port 25 through the telescopically-slidable sleeve duct assembly 27 to the outlet port 26 in casing 10. The above operation is accomplished by the rotatable drive shaft 16 rotating the cam 15 to contact cam follower 14' and move the pistons 12' and 12 to the right, as viewed in Figure 1, while simultaneously rotating the distributor valve 22 synchronously with the cam 15. As the drive shaft 16 rotates 180 degrees, the cam 15 and the valve 22 will accordingly be rotated 180 degrees, in order that the cam 15 will contact the cam follower 14 to move the pistons 12 and 12' to the left, as viewed in Figure 1. At this time, the inlet duct 23' and inlet port 23 of valve 22 will be in communication with the passageway 17' and the outlet duct 25' and outlet port 25 will be in communication with passageway 17. Fluid will then be drawn in through inlet chamber 24, through inlet port 23, inlet duct 23', and through passageway 17' and recess 18' into chamber 11'. Simultaneously, a metered quantity of fluid will be discharged from cylinder 11 through recess 18, passageway 17, outlet duct 25', outlet port 25 and through the telescopically-slidable sleeve duct assembly 27 to the outlet port 26 of casing 10.

As is noted from the description of the operation, the distributor valve 22 is in continuous rotational movement with respect to the telescopically-slidable sleeve duct assembly 27 or 27' and therefore, it is imperative that an operable seal be effected between the valve 22 and the assembly 27 or 27'. In the past, great difficulty has been encountered in attempts to perfect such an operative seal. However, with our new improved, simplified construction we have been able to not only provide a foolproof sealing action which compensates for irregularities in the valve surfaces, but also provide one which is easy and inexpensive to manufacture and assemble.

While we have illustrated and described herein our preferred embodiments of the invention, it will be understood that various changes and modifications may be made, without departing from the spirit of the invention and as defined within the scope of the following claims.

What we claim is:

1. In a multi-piston fluid meter or the like having a rotary valve with separate passageways which simultaneously communicate between an input port and a first cylinder and between an output port and a second cylinder, wherein at least one such passageway is an axial bore, the improvement comprising, a pair of telescopically-slidable sleeve members, one sleeve member being fixed to the meter between an input and an output port, and the other sleeve member being maintained in a sliding sealing contact with an end face of the rotary valve lying transverse to the axis of rotation of the valve, a pair of opposed sealing surface portions formed between said sleeve members, a portion of said other sleeve member forming a radially-inwardly backing surface extending between inner edges of said opposed sealing surface portions, a resilient annular gasket compressibly retained between said sealing surface portions and adjacent said backing surface to seal the telescopically slidable connection between said members and to resiliently urge said other sleeve member into operable sealing engagement with the end face of the rotary valve.

2. In a multi-piston meter or the like having a rotary valve provided with a passageway communicating between an input port and one cylinder and a second passageway simultaneously communicating between an output port and a second cylinder, the improvement comprising, a pair of interfitting annular members, one member being fixed to the meter between an input port and an output port, and the other member being maintained in sliding, sealing contact with an end surface of the rotary valve which lies transverse to the axis of rotation of the valve, axially-extending tubular portions on each of said annular members, one tubular portion telescopically fitting within the other tubular portion to form an axially-extending passage, resilient sealing means compressibly retained within a three-sided channel portion formed between the two annular members, said channel portion comprising a pair of opposed radially-outwardly-extending gripping and sealing surfaces formed on said annular members and a back retaining surface formed on said one tubular portion connecting said opposed gripping and sealing surfaces, said resilient means urging said annular members axially apart and sealing the axially-extending passage adjacent the telescopic fitment between the members to thereby form a fluid-tight axially-extending passageway from the rotary valve to an output port.

3. The improvement as defined in claim 2 wherein the one axially-extending tubular portion extends axially through the other of said tubular portions, and a clamping ring retains the other of said members on said one member.

4. The improvement as defined in claim 2 wherein the resilient means comprises an annular gasket of foraminous material.

5. The improvement as defined in claim 2 wherein said opposed gripping and sealing surfaces converge radially-outwardly to positively retain the resilient means within the three-sided channel portion.

6. The improvement as defined in claim 2 wherein the resilient means comprises an annular gasket of resilient material having an annular recess formed therein, and means within said recess for compressibly retaining said gasket in operative position.

7. In a fluid meter having a rotary distributor valve with separate conduits for simultaneously communicating separate cylinders with an outlet port and an inlet port respectively of the fluid meter, the improvement comprising, a telescopically-slidable sleeve duct assembly providing a fluid-tight passageway between an upper surface of the rotary valve and an outlet port which comprises, an outer cylindrical housing part secured to the meter about an outlet port and adjacent an inlet port, a nose part axially slidable within said housing part, radial flange means for limiting the upward movement of said nose part within said housing part, opposed surfaces formed between said radial flange means and said housing part, a portion of said nose part forming a radially inner backing surface adjacent said opposed surfaces, sealing means compressibly positioned between said opposed surfaces for resiliently urging said nose part downwardly into operable sealing engagement with a top surface of the rotary valve and for sealing the slidable joint formed between the nose part and the housing part, and means for limiting the downward movement of said nose part within said housing part.

8. A device as defined in claim 7 wherein said opposed surfaces are outwardly converging to retain said sealing means in position against said inner backing surface and between said housing member and said nose part.

9. The improvement as defined in claim 7 wherein said sealing means comprises an annular gasket made of foraminous material.

10. The improvement as defined in claim 7 wherein said sealing means comprises a foam rubber annular gasket.

11. The improvement as defined in claim 7 wherein, said sealing means comprises a resilient annular gasket having an annular groove formed therein, and said gasket is retained in an operable sealing position by means of a coil spring positioned within said annular recess.

References Cited in the file of this patent

UNITED STATES PATENTS

| 2,451,234 | Mitchell | Oct. 12, 1948 |
| 2,841,121 | George | July 1, 1958 |

FOREIGN PATENTS

| 934,800 | Germany | Mar. 22, 1956 |